(12) United States Patent
Huang et al.

(10) Patent No.: US 8,823,334 B2
(45) Date of Patent: Sep. 2, 2014

(54) METHOD FOR STARTING AN ELECTRIC MOTOR

(71) Applicant: GE Aviation Systems LLC, Grand Rapids, MI (US)

(72) Inventors: Hao Huang, Troy, OH (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 59 days.

(21) Appl. No.: 13/665,142

(22) Filed: Oct. 31, 2012

(65) Prior Publication Data
US 2014/0117894 A1 May 1, 2014

(51) Int. Cl.
*H02P 9/10* (2006.01)

(52) U.S. Cl.
USPC ............... 322/59; 322/29; 322/44; 322/46; 322/39; 322/81; 318/471; 318/472; 318/432

(58) Field of Classification Search
CPC ........... H02P 9/48; H02K 19/26; H02K 19/38
USPC ......... 318/471, 472, 101, 102, 139, 140, 430, 318/432, 89; 322/59, 29, 39, 44, 46, 81; 123/406.58; 290/27
See application file for complete search history.

(56) References Cited

U.S. PATENT DOCUMENTS

| | | | |
|---|---|---|---|
| 5,055,700 A | 10/1991 | Dhyanchand | |
| 5,068,590 A | 11/1991 | Glennon et al. | |
| 6,844,707 B1 * | 1/2005 | Raad | 322/29 |
| 7,122,994 B2 | 10/2006 | Anghel et al. | |
| 7,301,311 B2 * | 11/2007 | Xu et al. | 322/59 |
| 7,508,086 B2 | 3/2009 | Huang et al. | |
| 7,821,145 B2 | 10/2010 | Huang et al. | |
| 2010/0270798 A1 * | 10/2010 | Poulsen et al. | 290/44 |

* cited by examiner

*Primary Examiner* — Antony M Paul
(74) *Attorney, Agent, or Firm* — McGarry Bair PC

(57) ABSTRACT

A method for starting an electric motor, the motor having a main machine, exciter, and permanent magnet generator (PMG), each having a stator and a rotor, with each rotor mounted to a common shaft, the method comprising starting the main machine in an asynchronous mode by applying a starting current to the stator of the main machine to induce a damper current in a damper winding of the main rotor to generate a starting torque that initiates the rotation of the common shaft, and then running the main machine in synchronous mode by supplying running current from the exciter rotor to the main machine rotor.

18 Claims, 4 Drawing Sheets

METHOD FOR STARTING AN ELECTRIC MOTOR

BACKGROUND OF THE INVENTION

In synchronous motors, especially of the type used on aircraft, a damper winding is used on a main machine rotor for improving generator transient performances. As the synchronous motor has no starting torque, some form of auxiliary power unit (APU) is used to supply power to drive an alternating current (AC) exciter during an asynchronous starting mode to generate a rotating field in the exciter, and consequently, to generate torque. The torque rotates the common rotatable shaft until the synchronous exciter can produce sufficient AC voltage at the output of the exciter rotor winding to power the main rotor, allowing synchronous running mode.

BRIEF DESCRIPTION OF THE INVENTION

A method for starting an electric motor, the motor having a main machine, exciter, and permanent magnet generator (PMG), each having a stator and a rotor, with each rotor mounted to a common shaft, the method comprising starting the main machine in an asynchronous mode by applying a starting current to the stator of the main machine to induce a damper current in a damper winding of the main rotor to generate a starting torque that initiates the rotation of the common shaft, and then running the main machine in synchronous mode by supplying running current from the exciter rotor to the main machine rotor.

DESCRIPTION OF EMBODIMENTS OF THE INVENTION

Figure 1:
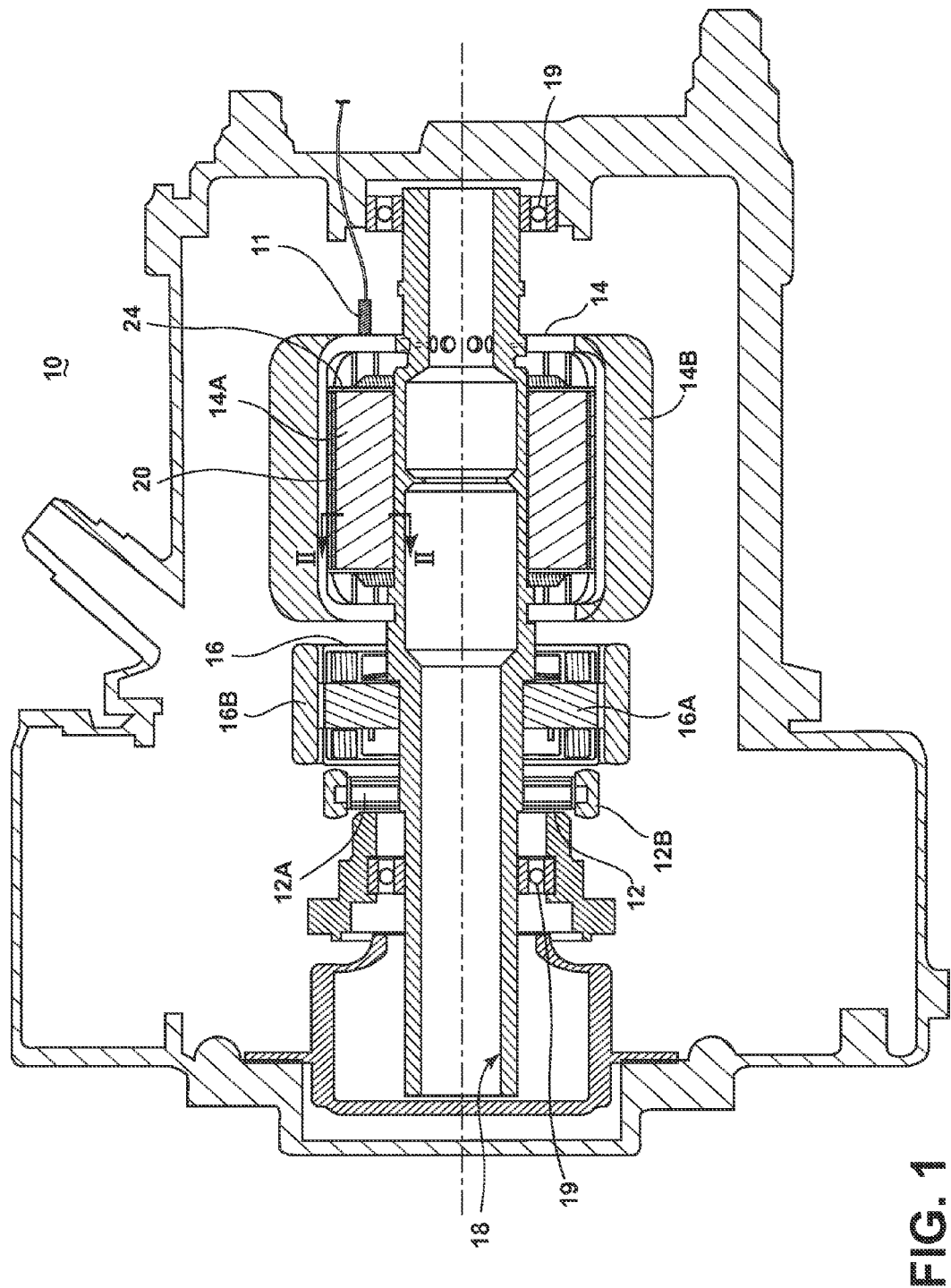
FIG. 1 is a sectional view of a starter/generator assembly.

While the invention may be implemented in any environment using a synchronous electric motor, it is current contemplated to be implemented in a jet engine environment, where the electric motor is typically referred to as a machine, an example of which is a starter/generator (S/G). Thus, a brief summary of the contemplated environment should aid in a more complete understanding. FIG. 1 schematically illustrates an S/G assembly 10 mounted on or within a gas turbine aircraft engine. The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

The S/G assembly 10 may be mounted on the outside of either the air intake region of the gas turbine engine containing the fan or on the core near the high pressure compression region. At least one voltage output is provided on the exterior of the S/G assembly 10 to provide for the transfer of electrical power to and from the S/G assembly 10. This power connection, as illustrated, is transmitted by an electrical power cable 11 and may provide for a three phase with a ground reference output from the S/G assembly 10.

The S/G assembly 10 comprises a rotatable shaft 18, synchronous main machine 14, an exciter 16, and a permanent magnet generator (PMG) 12. The rotatable shaft 18 is supported by spaced bearings 19. Each of the PMG 12, main machine 14, and exciter 16 have a rotor 12a, 14a, 16a, respectively, and a corresponding stator 12b, 14b, 16b, respectively. The rotors 12a, 14a, 16a are mounted to the rotatable shaft 18 for rotation relative to the stators 12b, 14b, 16b, which are rotationally fixed within the S/G assembly 10. The stators 12b, 14b, 16b may be mounted to any suitable part of housing portion of the S/G assembly 10.

In the illustrated embodiment, the main machine 14 is located in the rear of the S/G assembly 10 and the PMG 12 is positioned in the front of the S/G assembly 10. The exciter 16 is positioned in the S/G assembly 10 between the main machine 14 and the PMG 12. Other positions of the main machine 14, PMG 12, and exciter 16 are envisioned and the patentable scope should not be limited by any single embodiment.

The main machine rotor 14a comprises damper windings 20, short-circuited by conducting plates 24 at its ends, used to prevent pulsating variations of the position or magnitude of the magnetic field linking the poles during steady-state operation of the S/G assembly 10. Stated another way, the damper winding 20 dampens any speed fluctuations that may occur as a result of load changes at the electrical connections of the S/G assembly 10 during normal operation.

Figure 2:
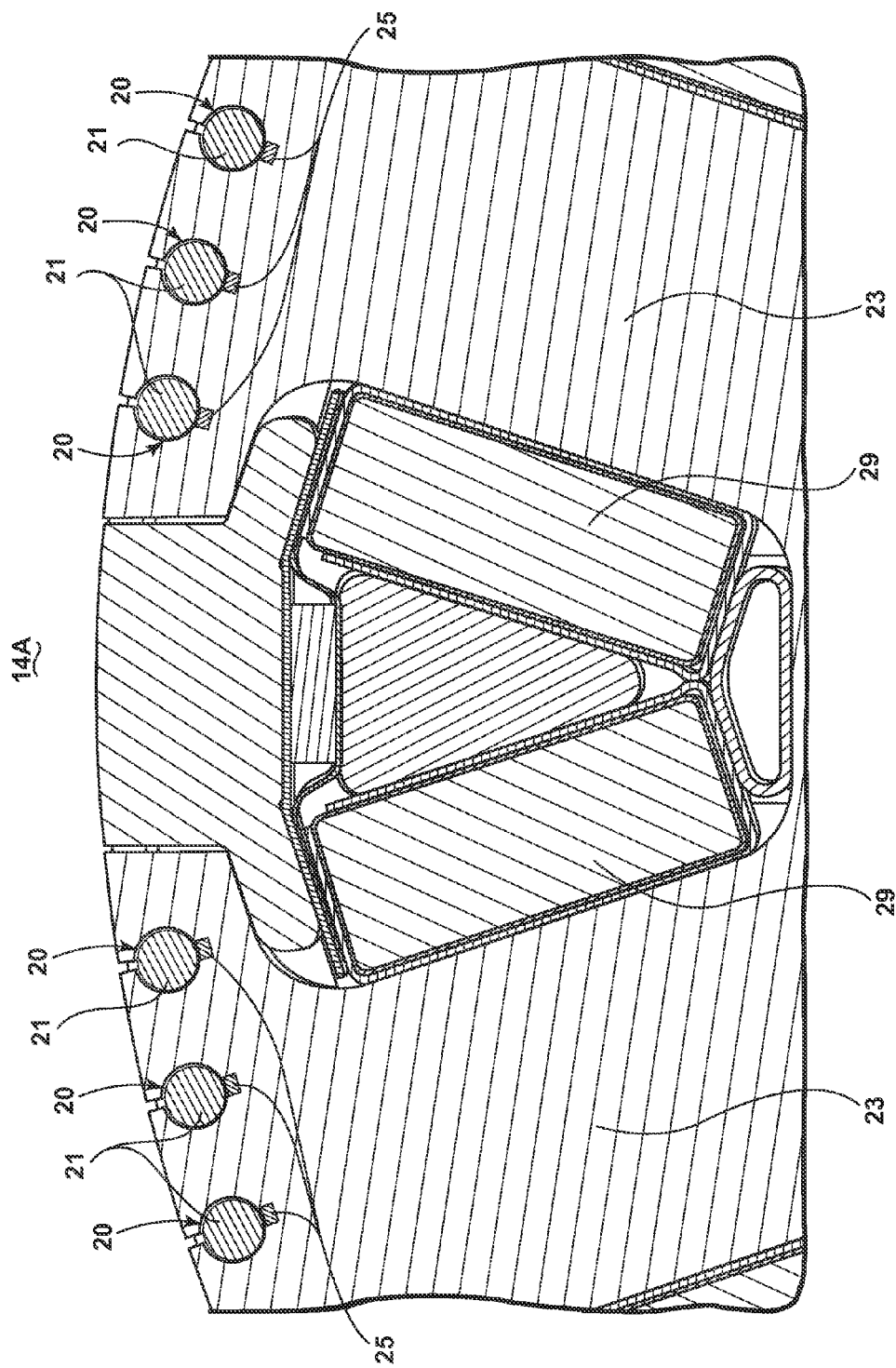
FIG. 2 is a partial sectional view taken along line 2-2 of FIG. 1 showing the damper winding assembly.

Turing now to FIG. 2, the damper windings 20 of the main machine rotor 14a comprise windings of conductive material 21, such as copper, affixed on the field poles 23 of the main machine rotor 14a. The damper windings 20 are thus radially spaced about the main machine rotor 14a. The main machine rotor 14a further comprises electrical windings 29 running the length of the main machine rotor 14a and positioned between field poles 23.

A typical 400 Hz S/G assembly 10 has between 2 to 4 poles, with each pole having 5 to 11 damper windings 20. As exemplified, the damper winding 20 is comprised of copper having a diameter between 0.060"-0.250". As a further example, an oil-cooled 100 kW generator produces a current in the damper windings 20 as high as 300 A.

Figure 3:
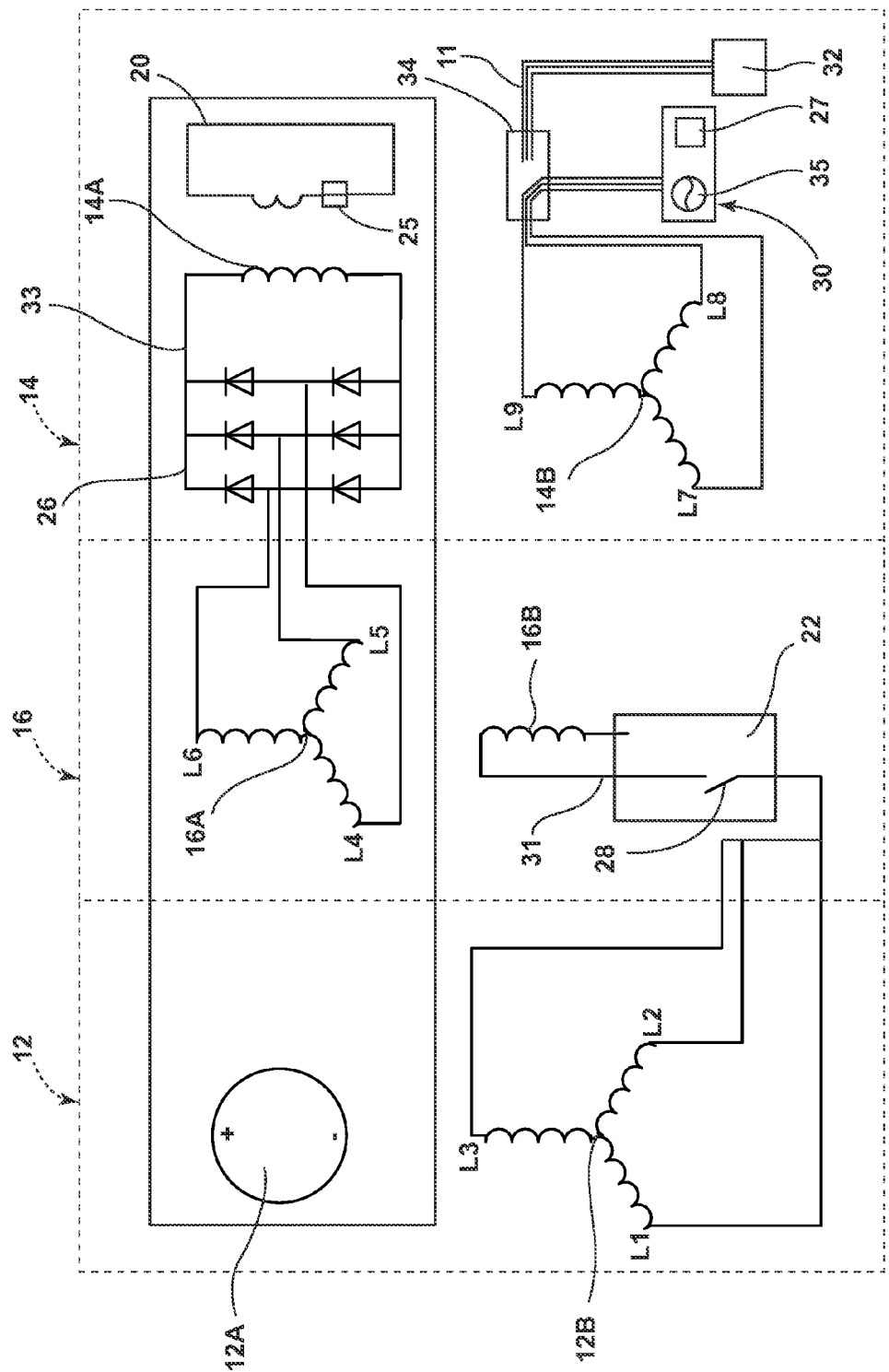
FIG. 3 is a schematic view of a starter/generator assembly rotatable shaft.

Referring to FIG. 3, The S/G assembly 10 further comprises a generator control unit (GCU) 22. The GCU 22 comprises an electronic switch 28 having an open and closed position, wherein the exciter stator 16b is electrically disconnected when the switch 28 is in the open position and the stator 16b is electrically connected when the switch 28 is in the closed position.

The PMG rotor 12a comprises a permanent magnet with at least two poles and the PMG stator 12b comprises windings arranged to provide for three phase output along leads L1, L2, L3 which are supplied to a common supply line to the exciter stator 16b, via the GCU 22.

The exciter stator 16b comprises exciter windings coupled to the output lead 31 of the GCU 22. The exciter rotor 16a comprises windings arranged to provide for three phase output along leads L4, L5, L6 which, as illustrated, are supplied to a rectifier 26, which is illustrated as a diode-based rotating rectifier. The rectifier 26 further supplies a common supply line 33 to the main machine rotor 14a.

The main machine stator 14b has leads L7, L8, L9 arranged to couple with an asynchronous starting control switch 34 having a first position, and a second position, wherein the stator 14b is connected to an external power source, such as a single-phase starter drive 30, when the switch is in the first position, and wherein the stator 14b is connected to an electrical power distribution node 32 of the aircraft when the switch is in the second position.

The starter drive 30 comprises an AC power source 35 and a controller 27 capable of regulating the frequency of the starter drive 30 power output. Alternate external power sources are envisioned, including the power output of another running engine, a common three phase wall plug, or even a direct current (DC) source such as batteries, when coupled with an inverter to generate the necessary three phase power, so long as the alternate external power source is capable of regulating the power output to single-phase AC with frequency control described herein.

Figure 4:
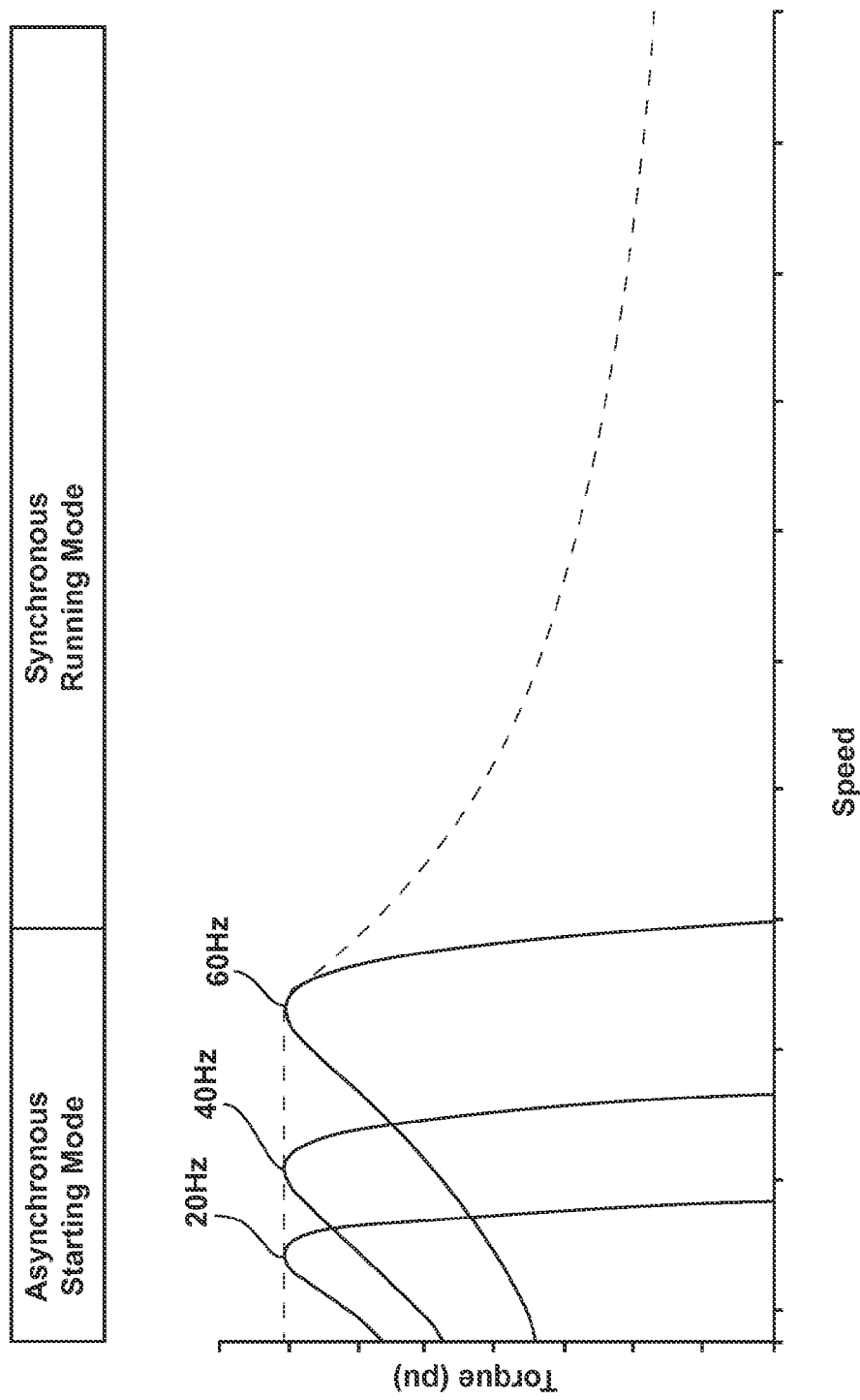
FIG. 4 is a graph showing the speed of generator as torque is applied during the asynchronous and synchronous operating modes.

Referring to FIG. 4, the S/G assembly 10 according to the inventive method operates in two distinct modes: an asynchronous starting mode and a synchronous running mode, wherein the starting asynchronous mode operates to provide starting torque and acceleration of the rotatable shaft 18 and the running synchronous mode operates by steady-state self-sufficiency.

At the start of the asynchronous starting mode, the rotatable shaft 18 is not rotating, the electronic switch 28 of the GCU 22 is in an open state to uncouple the PMG stator 12b voltage output from the exciter stator 16b, and the control switch 34 is in the first position to receive AC power input from the starter drive 30 to the leads L7, L8, L9 of the main machine stator 14b.

From this condition, the AC power input from the starter drive 30 generates a rotating magnetic field in the main machine stator 14b, which in turn induces a current on the damper windings 20 of the main machine rotor 14a. The ensuing induced current generates sufficient torque upon the main machine rotor 14a to begin rotation of the attached rotatable shaft 18.

During current induction upon the damper windings 20, the APU controller 27 provides frequency-stepping operations over a period of time to increase the field frequency of the generated power supplied to the main machine stator 14b. This single phase, frequency-stepping operation induces optimized torque on the rotating main machine rotor 14a, accelerating the rotation of the rotatable shaft 18.

For example, the APU controller 27 provides for the frequency-stepping operation by increasing the main machine stator 14b field frequency continuously to provide maximum starting torque on the main machine rotor 14a. This method of frequency-stepping operation provides a constant torque on the main machine rotor 14a, and consequently the rotatable shaft 18, during the asynchronous starting mode.

The induced currents also generate heat in the damper windings 20, which has a known thermal limit at which the winding 20 fails. In one example, a typical damper winding 20 thermal limit is between 200-240 degrees Celsius. Care must be taken during the initial asynchronous mode to prevent thermal damage to the damper winding 20, which is a relatively small winding that is not designed to function as a start winding. In one example, a typical start winding may have three times the cross-sectional area of a damper winding 20 (diameter of 0.239"-0.488") and may be configured to continuously withstand twice the amount of damper winding 20 current. The damper winding 20, as illustrated, is coupled with a temperature sensor 25 for monitoring the thermal status of the winding 20.

During the asynchronous starting mode, the method should drive power into the main machine stator 14b as high as the resulting heat generated in the damper winding 20 will allow, without damper winding 20 failure as measured by the temperature sensor 25. In one example, the temperature sensor 25 measurement may be wirelessly transmitted. One goal of the method is to reach the target rotational frequency as fast as possible. This maximum input power generates a peak amount of torque on the rotatable shaft 18 during each of the frequency-stepping segments, and accordingly, a faster rotational acceleration without thermal failure of the damper windings 20. Alternatively, the length of the asynchronous starting mode segments may be a pre-calculated time based on the specific generator and known electrical characteristics of the system. In one example, the total pre-calculated period for the asynchronous starting mode is between 10-25 seconds.

Once the rotatable shaft 18 reaches operational frequency from the frequency-stepping operations, for example 60 Hz, the method changes from asynchronous starting mode to synchronous running mode. At the time of this mode change, the asynchronous starting control switch 34 toggles from the first position to the second position, wherein the main machine stator 14b output leads L7, L8, L9 are supplying three phase electrical power to the electrical power distribution node 32 of the aircraft. The GCU electronic switch 28 also toggles from an open to closed state, electrically connecting the GCU 22 to the output leads L1, L2, L3 of the PMG stator 12b.

During the synchronous running mode, the rotating PMG rotor 12a generates a three phase output in the leads L1, L2, L3 of PMG stator 12b, supplying power the GCU 22. The GCU 22, in turn, continues to lead the rotational frequency of the rotatable shaft 18 to the steady-state operating frequency, 60 Hz, by the GCU 22 and exciter stator 16b.

The steady-state rotation of the exciter rotor 16a generates a three phase power at the leads L4, L5, L6, which is converted to DC power by the rotating rectifier 26. The DC power is supplied to the main machine rotor 14a, rotating with the main machine stator 14b, generating the operational S/G assembly 10 three phase power output at leads L7, L8, L9 to supply electrical power distribution node 32 of the aircraft.

The speed of the rotating shaft 18 is shown in FIG. 4 in relation to the torque applied during the asynchronous starting mode and synchronous running mode. The induced current in the damper winding 20 during the frequency-stepping operation is illustrated as torque curve snapshots from frequencies at 20, 40, and 60 Hz, even though in reality there will be essentially an infinite number of torque curves as controller continuously changes the frequency, resulting in the dotted line at the maximum torque level during the asynchronous starting mode. The dotted line represents the constant torque during asynchronous starting mode. Once starting is accomplished, the controller is not operated to maximize torque, resulting in the torque curve dropping off during synchronous running mode. Also shown in FIG. 4 is the change from asynchronous starting mode to synchronous starting mode once the rotational speed reaches a target value.

The method disclosed herein provides for aircraft engine starting using damper windings. One advantage that may be realized in the above method is that the method provides sufficient starting torque via the damper windings 20 to rotate the rotatable shaft 18 without the need for external AC excitation at the exciter stator 16b.

When designing aircraft components, important factors to address are size, weight, and reliability. The above described method has a decreased number of parts as the system will be able to provide S/G assembly 10 starting without the need for AC excitation electronic circuitry to be added into the existing GCU 22, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

The components may be any combination of known synchronous motors and generators. In addition to the accessories shown in this embodiment, there may be other components that may need to be operated for particular applications. For example, in addition to the electromechanical accessories shown, there may be other accessories driven from the same rotatable shaft 18 such as an oil pump, a fluid compressor, or a hydraulic pump. Although the method describes three phases, single phase, a three sequential segment acceleration reaching 60 Hz, other phases, segments, and frequencies are contemplated for use in the initial, accelerating, and steady-state operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a machine having a main machine, exciter, and permanent magnet generator (PMG), each having a stator and a rotor, with each rotor mounted to a common shaft, the method comprising:
    applying a starting current to the stator of the main machine to induce a damper current in a damper winding of the main machine rotor to generate a starting torque that initiates the rotation of the common shaft;
    inducing a PMG current in the stator of the PMG in response to the rotation of the PMG rotor with the common shaft;
    supplying the PMG current to the exciter stator to induce an exciter rotor current in the rotor of the exciter; and
    supplying the exciter rotor current to the rotor of the main machine;
    wherein the applying of the starting current is terminated prior to the damper winding exceeding its thermal limit.

2. The method of claim 1 wherein the applying the starting current comprises generating the starting current from a DC power source.

3. The method of claim 2 wherein the generating the starting current comprises inverting the DC power source to generate an AC current for the starting current.

4. The method of claim 3 wherein the AC current is three phase.

5. The method of claim 1 wherein the inducing the PMG current comprises inducing an AC current.

6. The method of claim 5 wherein the AC current is three phase.

7. The method of claim 6 wherein supplying the PMG current to the exciter stator comprises converting the PMG current from three phase to single phase.

8. The method of claim 1 wherein the supplying the PMG current to the exciter stator comprises converting the PMG current to an exciter stator current.

9. The method of claim 8 wherein the converting the PMG current to the Exciter Stator current comprises increasing the frequency of the exciter stator current over time.

10. The method of claim 1 wherein the supplying the exciter rotor current to the rotor of the main machine comprises rectifying the exciter rotor current.

11. The method of claim 1 wherein the supplying the PMG current to the exciter stator occurs prior to the damper winding reaching its thermal limit.

12. The method of claim 1 wherein the termination of the applying of the starting current occurs simultaneously with the supplying the PMG current to the exciter stator.

13. A method for operating a machine having a main machine, exciter, and permanent magnet generator (PMG), each having a stator and a rotor, with each rotor mounted to a common shaft, the method comprising:
    starting the main machine in an asynchronous mode by applying a starting current to the stator of the main machine to induce a damper current in a damper winding of the main machine rotor to generate a starting torque that initiates the rotation of the common shaft;
    switching from the asynchronous mode to a synchronous mode prior to the damper winding reaching its thermal limit; and
    running the main machine in the synchronous mode by supplying running current from the exciter rotor to the main machine rotor.

14. The method of claim 13 wherein the applying the starting current comprises generating the starting current from a DC power source.

15. The method of claim 14 wherein the generating the starting current comprises inverting the DC power source to generate an AC current for the starting current.

16. The method of claim 15 wherein the AC current is three phase.

17. The method of claim 13 wherein the switching from asynchronous mode to synchronous mode occurs simultaneously with the termination of the applying of the starting current.

18. The method of claim 13 further comprising switching from asynchronous mode to synchronous mode simultaneously with the termination of the applying of the starting current.

* * * * *